Figure 1:
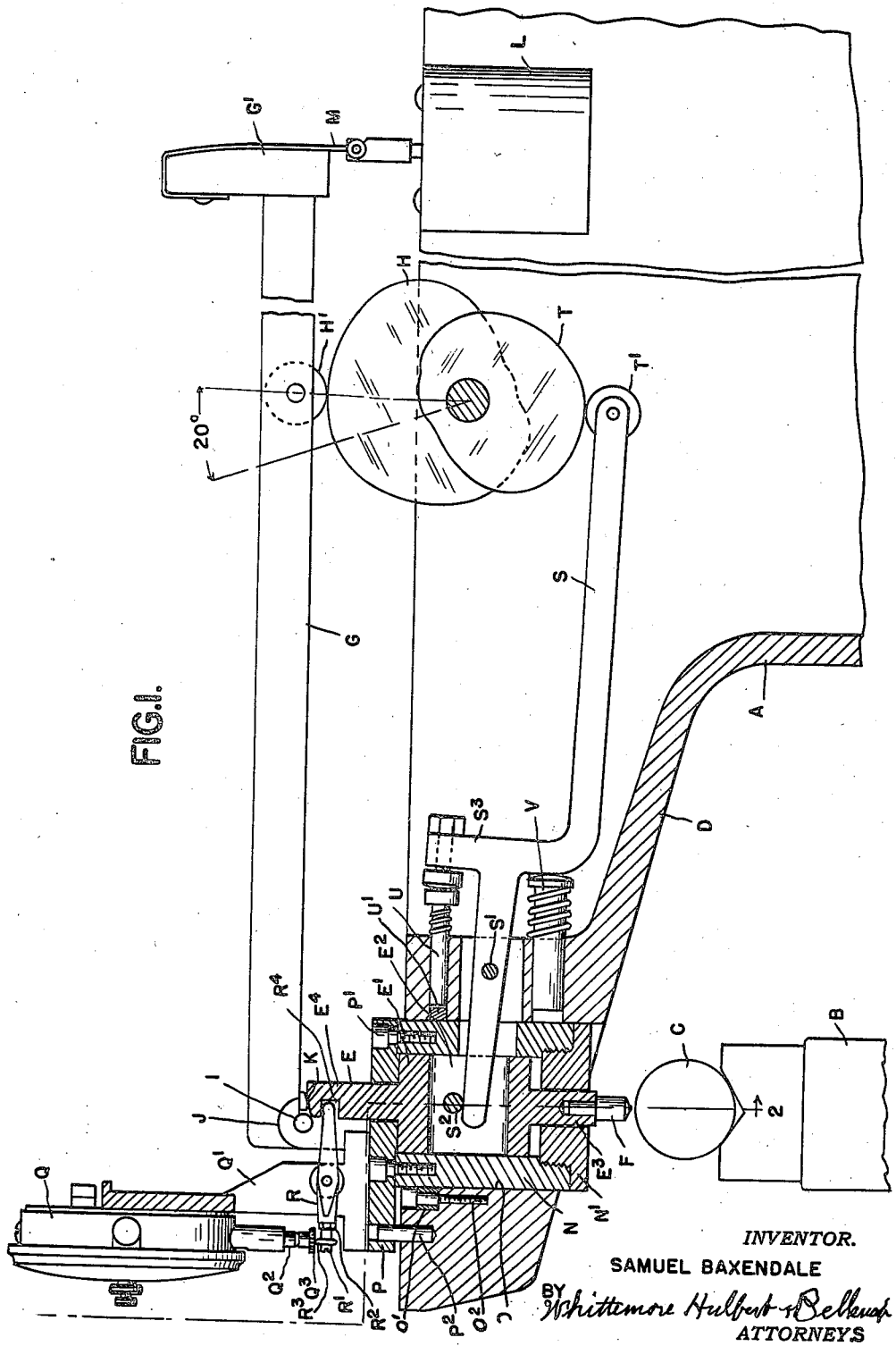

March 24, 1942.                S. BAXENDALE                 2,277,199
                           HARDNESS TESTING MACHINE
                             Filed Sept. 3, 1940              2 Sheets-Sheet 1

INVENTOR.
SAMUEL BAXENDALE
BY Whittemore Hulbert & Belknap
ATTORNEYS

March 24, 1942.　　S. BAXENDALE　　2,277,199
HARDNESS TESTING MACHINE
Filed Sept. 3, 1940　　2 Sheets-Sheet 2

INVENTOR.
SAMUEL BAXENDALE
BY *Whittemore Hulbert & Belknap*
ATTORNEYS

Patented Mar. 24, 1942

2,277,199

UNITED STATES PATENT OFFICE 2,277,199

HARDNESS TESTING MACHINE

Samuel Baxendale, Dearborn, Mich., assignor to Modern Collet & Machine Company, Ecorse, Mich., a corporation of Michigan Application September 3, 1940, Serial No. 355,250

4 Claims. (Cl. 265—12)

The invention relates to hardness testing machines of that type employing a penetrator and in which the hardness is measured by the depth of penetration into the work. It is well understood that to obtain an accurate indication of hardness, it is necessary that the penetrator should first be pressed against the work with a predetermined minor load to make an initial indentation and that the measurement should be the additional depth of penetration beyond this point. Where, however, the machine is designed for rapid operation in the testing of successive specimens, it is difficult to produce an indication which will exclude the movement under minor load measuring only the penetration under major load.

It is the object of the instant invention to obtain an instrument which will accomplish this result and to this end, the invention consists in the construction as hereinafter set forth.

Figure 2:
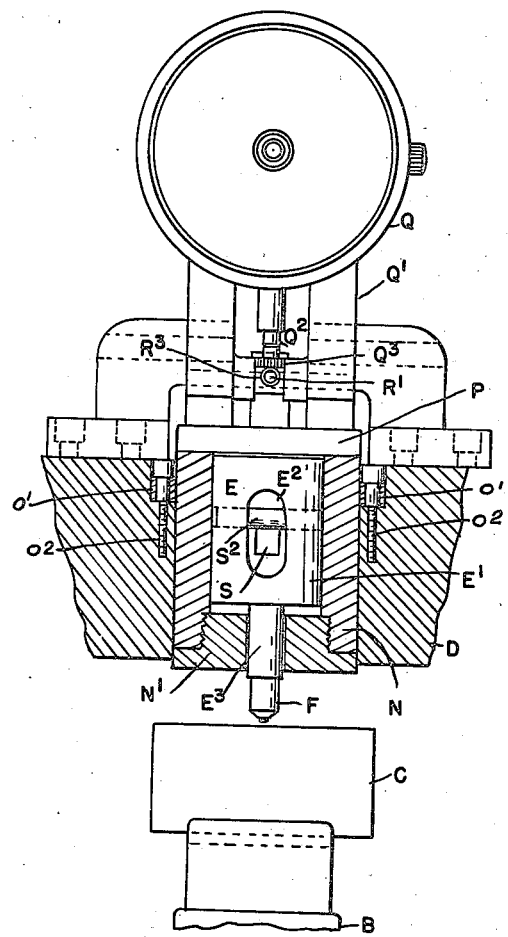

In the drawings:

Figure 1 is a vertical longitudinal section through a portion of a hardness testing machine embodying my invention; and Figure 2 is a sectional elevation substantially on line 2—2 of Figure 1.

A is the supporting frame of the machine which is provided with means (not shown) for supporting a vertically adjustable anvil B adapted to support the work C. D is an arm on the frame which extends laterally over the anvil B and provides a bearing for a vertically movable plunger E carrying the penetrator F. G is a lever operatively associated with the plunger E to apply a load thereto, and H is a cam for reciprocating the lever G in a vertical plane. As specifically shown in Figure 1, the lever G is fulcrumed on a pivot I engaging bracket bearings J on the frame and the engagement between the lever and the plunger E is through the medium of an involute bearing K. This will compensate for change in angularity of the lever maintaining its bearing on the plunger always in the same vertical line which is a fixed distance from the axis of the fulcrum pivot I. The outer end of the lever G has a segment G' and the actuating weight L is connected to the lever by a flexible band M passing over this segment. This maintains the weight L in the same vertical line in all positions of adjustment of the lever and in connection with the involute bearing K, maintains the same ratio between the long and short lever arms.

With the construction as thus far described, it will be obvious that the rotation of the cam H, which engages a roller bearing H' on the lever, will alternately raise and lower the lever through an amplitude of movement determined by the shape of the cam. The downward movement of the lever will be transmitted to the plunger E which, in turn, will actuate the penetrator F pressing it into the work with a predetermined force. However, it is necessary to provide clearance for the penetrator when in its raised position to permit of the engagement and disengagement of the work from the supporting anvil. Also, as above described, means must be provided for measuring the depth of penetration operating only after the minor load is first applied. Such operation is accomplished by the construction now to be described.

The plunger E is formed with a cylindrical body portion E' having a central vertically extending slot $E^2$ therein. The lower end of the plunger has a portion $E^3$ reduced in diameter which has a socket for receiving the penetrator member F. The upper end of the plunger has a portion $E^4$ reduced in diameter and fashioned at its upper end for engagement with the involute bearing K on the lever G. Surrounding and slidably engaging the plunger E is a sleeve member N which latter is slidably mounted in a bearing O in the arm D, said bearing preferably having a hardened segment O' secured by screws $O^2$ and forming a portion thereof. Secured to the upper end of the sleeve N is a shelf P which carries an indicator gauge Q through the medium of supporting brackets Q'. The operating member $Q^2$ of the gauge is connected, through the medium of a lever R, with the portion $E^4$ of the plunger E, and the arrangement is such that any movement of the plunger E independent of the sleeve N will be indicated on the gauge, whereas movement of the plunger E with the sleeve N will produce no indication but will leave the index hand at zero.

The plunger E is actuated by the lever G only in a downward direction and to raise the plunger and also to permit it to slightly descend into contact with the work, a second lever S is provided. This is fulcrumed at S' in the frame and has a short arm extending through a recess in the frame and into the slot $E^2$ in the portion E' of the plunger where it engages the underside of a cross pin $S^2$. The opposite end of the lever S extends into operative engagement with a cam T mounted to rotate with the cam H and bearing against a roller T' on the lever S. The cam T is so fashioned that the plunger E is first raised by the lever S so as to provide clearance for placing the work on the anvil and the plunger is then lowered until the penetrator contacts with the work under a predetermined minor load. On the other hand, the cam H is so fashioned and timed in relation to the cam T that the lever G is held in its raised position until after the application of the minor load and is then lowered under actuation of the weight L to apply to the penetrator the major load.

The shelf P, which is secured to the upper end of the sleeve N by bolts P', also extends over the large diameter portion E' of the plunger E which latter forms a shoulder for supporting the shelf and sleeve N on the plunger. This will permit the sleeve, shelf and gauge Q to move downward with the plunger E when the latter is lowered by the lever S until the penetrator F contacts with the work and applies the minor load thereto. Further movement of the plunger is temporarily arrested but the lever S continues to move separating from the cross pin $S^2$. This continued movement of the lever S is utilized to lock the sleeve N to its bearing O in the frame which is accomplished by a bell crank arm $S^3$ on the lever operating a laterally extending plunger U which engages a clamping shoe U' bearing against the sleeve N and preferably located in a recess in the member D. As a consequence, any further downward movement of the plunger E will be relative to the sleeve N which through the shelf P and bracket arms Q' supports the gauge Q. Also, this independent movement of the plunger E will, through the lever R and gauge actuating member $Q^2$, effect an indication on the gauge corresponding to the further depth of movement of the penetrator. Such further movement of the penetrator does not, however, occur until the lever G is permitted to descend by the cam H and the timing of this cam is such that descent of said lever begins only after the sleeve N has been locked to be rigid with the frame. As specifically illustrated, the cams H and T rotate 20° after the beginning of descent of the plunger E before the beginning of descent of the lever G. This gives time to contact the plunger with the work applying the minor load thereto and to lock the sleeve N to be stationary with the frame.

In further detail, the lever S is actuated by the cam T only in an upward direction, the opposite movement being effected by a spring pressed plunger V which bears against an offset in the lever S. The sleeve N is provided with a detachable head N' at its lower end forming a bearing engaging the reduced portion $E^3$ of the plunger, said head preferably having a threaded engagement with the sleeve. The shelf P is guided in its vertical movement by a pin $P^2$ rising from the frame and slidably engaging a bearing in the shelf. Adjustments for proper setting of the indicator gauge preferably include a vertically adjustable portion $Q^3$ at the lower end of the member $Q^2$; also, an adjustable extension R' for the lever R having a threaded engagement with the latter and held in adjusted position by a lock nut $R^2$. This extension R' has a bearing portion $R^3$ which engages the member $Q^3$ to actuate the same. The opposite end of the lever R engages a recess $R^4$ in the portion $E^4$ of the plunger.

With the construction as above described, the indicator gauge will be held at zero during the entire interval in which the gauge is travelling with the plunger and which includes the application of the minor load. Thus the subsequent indication on the gauge exactly corresponds to the depth of penetration under major load which accurately determines the hardness of the material.

What I claim as my invention is:

1. In a hardness testing machine, the combination with a frame, of a work supporting member and a penetrator member mounted on said frame for relative movement towards and from each other, one of said members being stationary with respect to said frame and the other movable, said movable member including a plunger, a sleeve surrounding and having a shouldered engagement with said plunger, said sleeve being slidably mounted in a bearing on said frame, an indicator mounted on said sleeve to be carried thereby, an operator for said indicator engaging said plunger, reciprocatory means for raising said plunger together with said sleeve and indicator to separate the penetrator from the work, said reciprocatory means permitting the descent of the plunger sleeve and indicator under gravity to contact the penetrator with the work and apply a minor load thereto, means operative after the application of the minor load for locking said sleeve in its bearing to hold it in rigid relation to said frame, reciprocating means for applying a major load to the penetrator, and timed means controlling the movement of said reciprocating means and said locking means whereby the major load is applied to the plunger subsequent to the application thereto of the minor load.

2. In a hardness testing machine, the combination with a frame, of a work supporting member and a penetrator member mounted on said frame for relative movement towards and from each other, one of said members being stationary with respect to said frame and the other movable, said movable member including a plunger, a sleeve surrounding and having a shouldered engagement with said plunger, said sleeve being slidably mounted in a bearing on said frame, an indicator mounted on said sleeve to be carried thereby, an operator for said indicator engaging said plunger, a reciprocatory lever for raising said plunger, sleeve and indicator to separate the penetrator from the work, said lever permitting the descent of said plunger, sleeve and indicator under gravity to contact the penetrator with the work and apply a minor load thereto, means operated by said lever subsequent to the application of the minor load for locking said sleeve in fixed relation to said frame, a second reciprocatory lever for applying a major load to said plunger, and timed means controlling the reciprocatory movements of said levers whereby the major load is applied to said plunger subsequent to the application of the minor load and the locking of said sleeve in said frame.

3. In a hardness testing machine, the combination with a frame, of a work supporting member and a penetrator member, one normally stationary and the other movable on said frame, said movable member including a plunger, a member carried by said plunger but separable therefrom, an indicator carried by said carried member, an operator for said indicator engaging said plunger, reciprocatory means for raising said plunger together with said carried member and indicator to separate the penetrator from the work, said reciprocatory means permitting the descent of said plunger, carried member and indicator under gravity to contact the penetrator with the work and to apply a minor load thereto, means operative after the application of the minor load for locking said carried member to hold the same in rigid relation to said frame, reciprocating means for applying a major load to the penetrator, and timed means controlling the movement of said reciprocating means and said locking means whereby the major load is applied subsequent to the locking of said carried member.

4. In a hardness testing machine, the combination with a frame, of a work supporting member and a penetrating member, one normally stationary and the other movable on said frame, said movable member including a plunger, a member carried by said plunger but separable therefrom, and an indicator carried by said carried member, an operator for said indicator engaging said plunger, a reciprocatory lever for raising said plunger and carried member to separate the penetrator from the work, said lever permitting the descent of said plunger, carried member and indicator under gravity to contact the penetrator with the work and to apply a minor load thereto, means operated by said lever subsequent to the application of the minor load for locking said carried member in fixed relation to said frame, a second reciprocatory lever for applying a major load to said plunger, and timed means controlling the reciprocatory movements of said levers whereby the major load is applied to said plunger subsequent to the application of the minor load and the locking of said carried member to said frame.

SAMUEL BAXENDALE.